United States Patent
Rowe et al.

(10) Patent No.: US 11,187,161 B2
(45) Date of Patent: *Nov. 30, 2021

(54) FUEL FLOW CONTROL

(71) Applicant: ROLLS-ROYCE plc, London (GB)

(72) Inventors: Arthur L Rowe, Derby (GB);
Alexander MacDonald, Derby (GB)

(73) Assignee: ROLLS-ROYCE plc, London (GB)

( * ) Notice: Subject to any disclaimer, the term of this patent is extended or adjusted under 35 U.S.C. 154(b) by 61 days.

This patent is subject to a terminal disclaimer.

(21) Appl. No.: 16/798,607

(22) Filed: Feb. 24, 2020

(65) Prior Publication Data

US 2020/0191065 A1 Jun. 18, 2020

Related U.S. Application Data

(63) Continuation of application No. 15/403,025, filed on Jan. 10, 2017, now Pat. No. 10,605,174.

(30) Foreign Application Priority Data

Jan. 27, 2016 (GB) ..................... 1601487

(51) Int. Cl.
*F02C 9/28* (2006.01)
*F02C 9/46* (2006.01)

(52) U.S. Cl.
CPC .............. *F02C 9/28* (2013.01); *F02C 9/46* (2013.01); *F05B 2270/3013* (2013.01); *F05D 2270/101* (2013.01); *F05D 2270/301* (2013.01)

(58) Field of Classification Search
None
See application file for complete search history.

(56) References Cited

U.S. PATENT DOCUMENTS

| | | | |
|---|---|---|---|
| 2,851,855 A | 9/1958 | Gamble | |
| 4,118,926 A | 10/1978 | Curvino et al. | |
| 4,470,118 A | 9/1984 | Morrison | |
| 4,722,180 A | 2/1988 | Lindler et al. | |
| 5,752,378 A | 5/1998 | Mirsky et al. | |
| 6,148,601 A | 11/2000 | Jones et al. | |
| 6,205,771 B1 | 3/2001 | Rowe | |
| 10,605,174 B2* | 3/2020 | Rowe | F02C 9/46 |
| 2001/0045088 A1 | 11/2001 | Sugitani | |
| 2003/0046937 A1* | 3/2003 | Mahoney | F02C 9/263 60/773 |
| 2007/0227155 A1 | 10/2007 | Nemet et al. | |

FOREIGN PATENT DOCUMENTS

| | | |
|---|---|---|
| EP | 0 092 425 A1 | 10/1983 |
| GB | 127426 A | 6/1919 |

OTHER PUBLICATIONS

Jun. 29, 2016 Search Report issued in British Patent Application No. 1601487.0.

Jun. 22, 2017 Extended Search Report issued in European Patent Application No. 17150831.0.

* cited by examiner

*Primary Examiner* — Scott J Walthour
(74) *Attorney, Agent, or Firm* — Oliff PLC

(57) ABSTRACT

A fuel flow control system is configured to perform a method including: setting a fuel flow demand proportional to compressor discharge pressure; detecting an actual fuel flow; and applying an enhanced schedule for fuel flow demand while fuel flow demand is less than a predefined proportion of actual fuel flow.

2 Claims, 5 Drawing Sheets

FUEL FLOW CONTROL

BACKGROUND

The present disclosure concerns a method of controlling fuel flow in a gas turbine engine. It also concerns a fuel flow control system and a fuel flow system for a gas turbine engine, which implement the method.

In a gas turbine engine it is conventional to control the fuel flow via a series of control laws. The amount of fuel flow may be determined by a function which is dependent on an engine shaft speed, a pressure ratio or a combination of these parameters. It may also be modulated by other factors such as altitude, for a gas turbine engine powering an aircraft. The fuel flow may be controlled to open loop, without feedback as to whether the instructed fuel flow has resulted in the desired engine speed change, or closed loop, with feedback.

Typically there are maximum and minimum fuel flow limiters which override the fuel flow control laws to ensure the engine is neither starved of fuel nor over-fuelled and hence flooded or caused to run away.

One problem with relying on the normal fuel flow control laws occurs when a gas turbine engine surges. In a surge the compressor discharge pressure drops rapidly regardless of the amount of fuel supplied to the engine. There is thus a danger of over-fuelling the engine during a surge. It is known to apply a surge control law so that fuel flow demand is pegged to the compressor discharge pressure, that is it is proportional to compressor discharge pressure, as it drops from detection of a surge condition. FIG. 2 shows this behaviour. The line $N_{L\_D}$ shows the unaltered speed demand for an exemplary one of the engine shafts and line $N_{L\_A}$ is the actual speed of the shaft. A surge occurs at approximately time 0.3. The line $P_{30}$ shows the compressor discharge pressure which drops rapidly following the surge event. The line $W_{f\_D}$ shows the demanded fuel flow which has a small increase as the actual shaft speed $N_{L\_A}$ drops as the control laws try to return the actual shaft speed $N_{L\_A}$ to the demanded shaft speed $N_{L\_D}$. Then the demanded fuel flow $W_{f\_D}$ drops away tracking the reduction in compressor discharge pressure $P_{30}$. The line is stepped due to the time constant of the applicable control law. The actual fuel flow $W_{f\_A}$ tracks the demanded fuel flow $W_{f\_D}$ with a lag.

When the compressor discharge pressure $P_{30}$ begins to recover, at approximately time 0.6, the demanded fuel flow $W_{f\_D}$ also begins to increase. The surge is recovered where the compressor discharge pressure $P_{30}$ and actual shaft speed $N_{L\_A}$ plateau, since at this level the actual fuel flow $W_{f\_A}$ is sufficient to sustain the current actual shaft speed $N_{L\_A}$. However, because the fuel flow demand $W_{f\_D}$ is lower than the actual fuel flow $W_{f\_A}$ the fuel flow continues to reduce and thus the recovered engine continues to decelerate.

The increase in demanded fuel flow $W_{f\_D}$ is limited by a maximum rate limiter and so the increase in fuel flow, and consequently the arresting of the actual shaft speed $N_{L\_A}$ decrease, is slow. Indeed, as illustrated the demanded and actual fuel flow $W_{f\_D}$, $W_{f\_A}$ have only recovered to around 30% of their maximum values by time 1.4 when the speed demand $N_{L\_D}$ is significantly reduced whereas before the surge, at the left hand side of FIG. 2, the demanded and actual fuel flows $W_{f\_D}$, $W_{f\_A}$ were over 90% of their maximum values.

SUMMARY

A disadvantage of the known method of controlling fuel flow during and following an engine surge is that the fuel flow demand $W_{f\_D}$ is heavily depressed by tracking compressor discharge pressure $P_{30}$ and is slow to recover to pre-surge levels.

According to a first aspect there is provided a method of controlling fuel flow in a gas turbine engine, the method comprising steps to:
  a) detect a surge condition;
  b) set fuel flow demand proportional to compressor discharge pressure;
  c) detect actual fuel flow; and
  d) apply an enhanced schedule for fuel flow demand while fuel flow demand is less than a predefined proportion of actual fuel flow.

Advantageously the method recovers fuel flow demand more quickly after a surge than known methods.

The method may comprise a further step to revert to normal fuel flow control laws once fuel flow demand equals or exceeds the predefined proportion of actual fuel flow. Advantageously the method only applies during surge and recovery.

Step c) may precede or occur in parallel to step b).

The method may comprise a step to apply a second enhanced schedule for fuel flow demand while fuel flow demand is less than a second predefined proportion of actual fuel flow demand; wherein the second predefined proportion is smaller than the predefined proportion. Advantageously this permits the fuel flow demand to recover to the actual fuel flow in two stages to reduce the likelihood of surge recurring.

The predefined proportion may be in the range 0.5 to 1.5. The predefined proportion may be in the range 0.5 to 1. The predefined proportion may be in the range 0.75 to 1. The second predefined proportion may be in the range 0.5 to 1.5. The second predefined proportion may be in the range 0.5 to 1. The second predefined proportion may be in the range 0.75 to 1.

The enhanced schedule may comprise a high rate of increase of fuel flow demand. The enhanced schedule may comprise the maximum of a) an enhanced rate of increase defined by the predefined proportion multiplied by the actual fuel flow minus the demanded fuel flow, divided by a time step and b) the normal rate of fuel flow increase. The enhanced schedule may comprise the sum of a) the predefined proportion multiplied by the actual fuel flow, and b) one minus the predefined proportion multiplied by the demanded fuel flow. Advantageously each of these embodiments of the enhanced schedule accelerates recovery following an engine surge.

The enhanced schedule may be limited by a maximum rate of change of fuel flow demand. This may reflect physical constraints of the system, for example valve slew rates, or may reduce the possibility of a recurrence of the surge.

The second enhanced schedule may comprise a higher rate of increase of fuel flow demand than the enhanced schedule. Advantageously the initial recovery of fuel flow demand from surge is rapid and then the rate slows as the fuel flow demand nears the actual fuel flow to reduce the likelihood of overshoot.

The actual fuel flow may be measured by a position of a fuel metering valve.

The present invention also provides a fuel flow control system configured to perform the method as described, and a fuel flow system comprising such a fuel flow control system. The present invention also provides a gas turbine engine comprising such a fuel flow control system, and a gas turbine engine comprising such a fuel flow system.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF EMBODIMENTS

Figure 1:
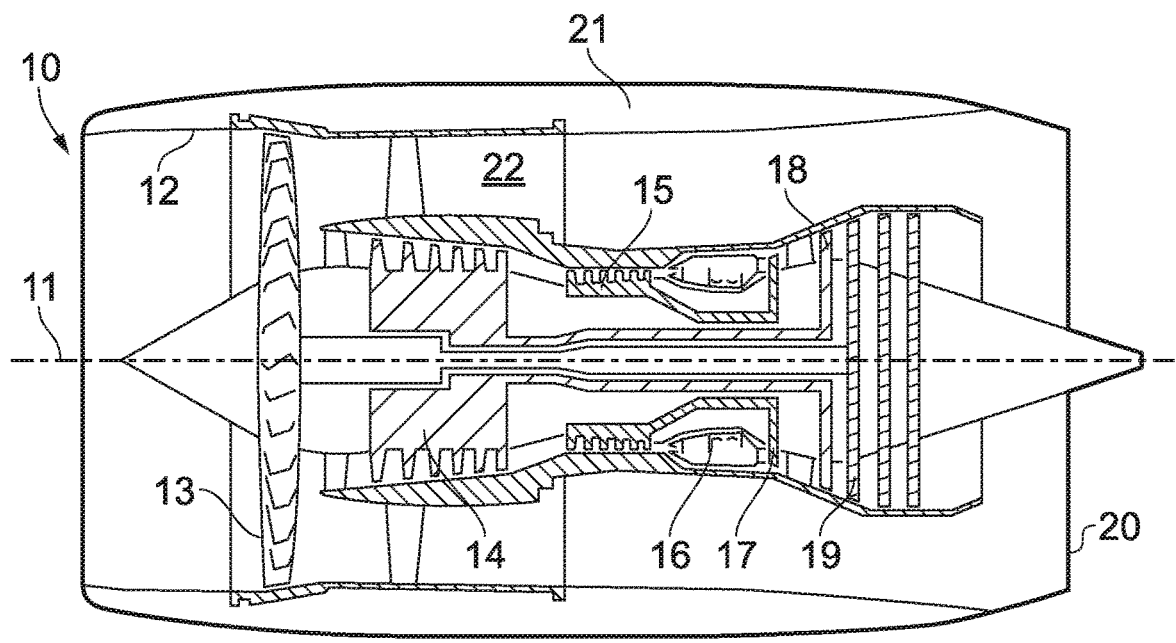
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 3:
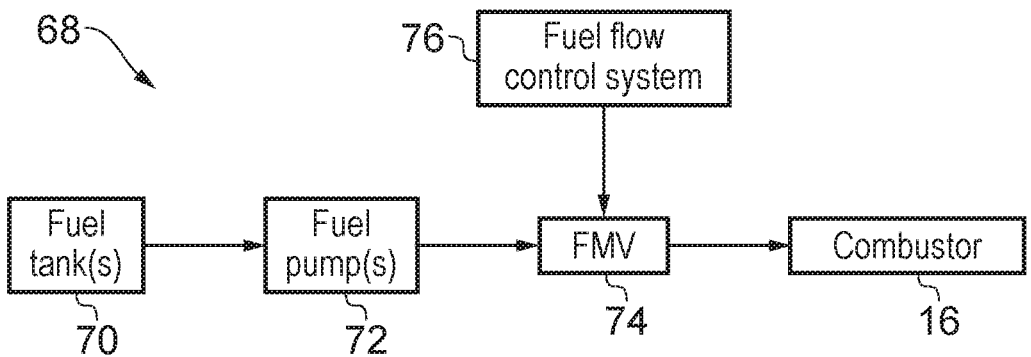
FIG. 3 is a schematic of a fuel flow control system.

A fuel flow system 68 is illustrated schematically in FIG. 3. Fuel is supplied to the gas turbine engine 10 from one or more fuel tanks 70, for example located in the aircraft body or wings where the gas turbine engine 10 powers an aircraft. The fuel may be pressurised through one or more pumps 72 and delivered to a fuel metering valve 74. The fuel metering valve 74 is controlled by a fuel flow control system 76 which implements methods of controlling the fuel flow in the gas turbine engine 10. The fuel metering valve 74 delivers the demanded fuel flow to the combustor 16, via one or more sets of fuel injectors.

Figure 4:
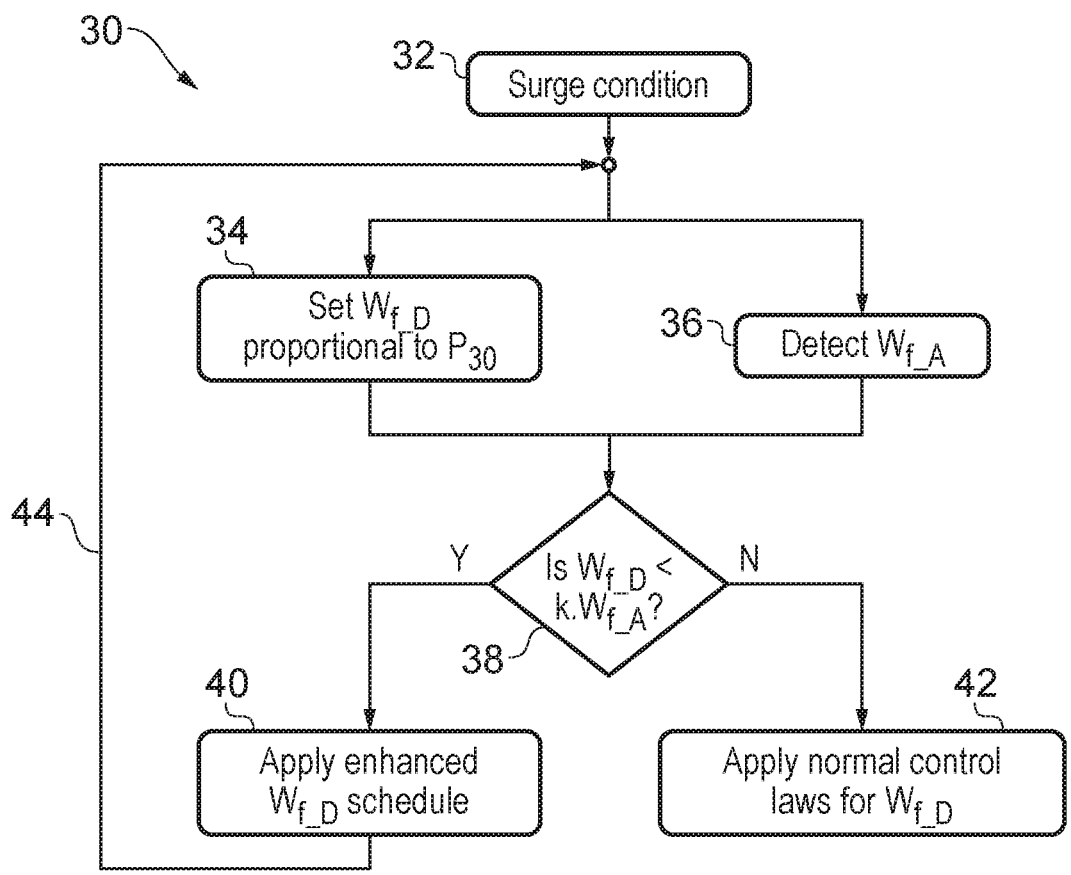
FIG. 4 is a flow chart of the method of the present invention.

A method 30 of controlling fuel flow in a gas turbine engine 10 is described with respect to FIG. 4. The method 30 may be implemented in the fuel flow control system 76. The method 30 acts in response to a surge condition 32. Optionally a pre-step to detect the surge condition 32 by any conventional method may be implemented in the method 30. For example, surge may be detected from a rapid reduction in compressor discharge pressure $P_{30}$. Alternatively the surge condition 32 need not be detected since the method 30 reacts to the effects of the surge without requiring explicit detection of the surge condition 32.

In step 34 of the method 30 the fuel flow demand $W_{f\_D}$ is set to be proportional to the compressor discharge pressure $P_{30}$. The relationship between fuel flow demand $W_{f\_D}$ and compressor discharge pressure $P_{30}$ may be linear, with a constant of proportionality, or may be non-linear. The relationship between fuel flow demand $W_{f\_D}$ and compressor discharge pressure $P_{30}$ may be defined by the maximum flow limiter for the fuel flow control system. An exemplary maximum flow limit is calculated as the compressor discharge pressure $P_{30}$ multiplied by a constant. The constant may itself be a function of engine speed.

Also in response to the surge condition 32 the current actual fuel flow $W_{f\_A}$ is detected, step 36. This step may occur before, during or after step 34 in which the fuel flow demand $W_{f\_D}$ is set proportional to compressor discharge pressure $P_{30}$.

Step 38 is a comparison step. The actual fuel flow $W_{f\_A}$ is multiplied by a predefined proportion k. The predefined proportion k may be a constant. It may be in the range 0.5 to 1. The demanded fuel flow $W_{f\_D}$ is then compared to the product of the predefined proportion k and the actual fuel flow $W_{f\_A}$. If the demanded fuel flow $W_{f\_D}$ is less than the product of the predefined proportion k and the actual fuel flow $W_{f\_A}$, thus $W_{f\_D} < k \cdot W_{f\_A}$, then an enhanced fuel flow demand schedule is applied at step 40. Conversely, if the demanded fuel flow $W_{f\_D}$ is greater than or equal to the product of the predefined proportion k and the actual fuel flow $W_{f\_A}$, thus $W_{f\_D} \geq k \cdot W_{f\_A}$, then the normal fuel flow control laws set the demand schedule, step 42.

Where the enhanced fuel flow demand schedule is applied, step 40, an iteration loop 44 ensures that the method 30 is repeated until the outcome of the comparison at step 38 returns the fuel flow demand schedule to the normal control laws, step 42.

The enhanced fuel flow demand schedule applied at step 40 of the method 30 provides a step increase to the fuel flow demand $W_{f\_D}$. Advantageously this allows the fuel flow demand $W_{f\_D}$, and thus the actual fuel flow $W_{f\_A}$, to recover to the pre-surge levels more quickly than in the known control methods. The maximum (and minimum) fuel flow limiters remain in operation throughout control of the fuel flow by the method 30. Therefore one or both of the limiters may override the fuel flow demand $W_{f\_D}$ generated by the enhanced fuel flow schedule if it is too aggressive for the engine conditions.

Figure 2:
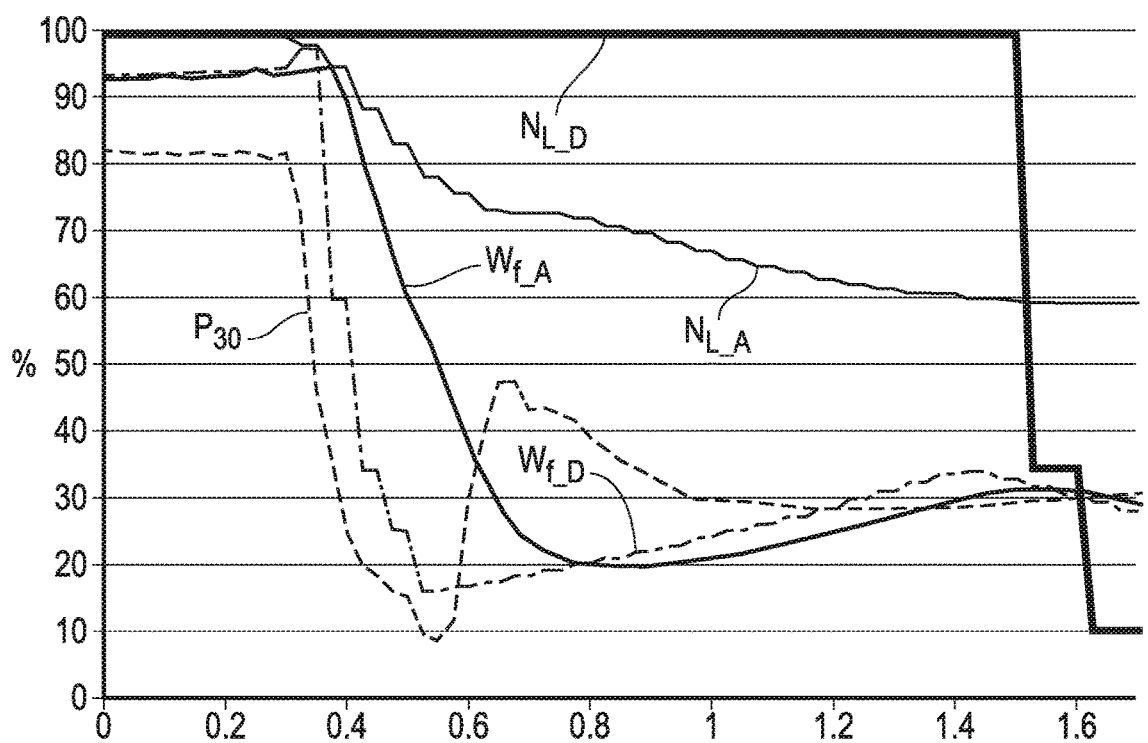
FIG. 2 is a graph of parameters during surge under conventional fuel flow control laws.
Figure 5:
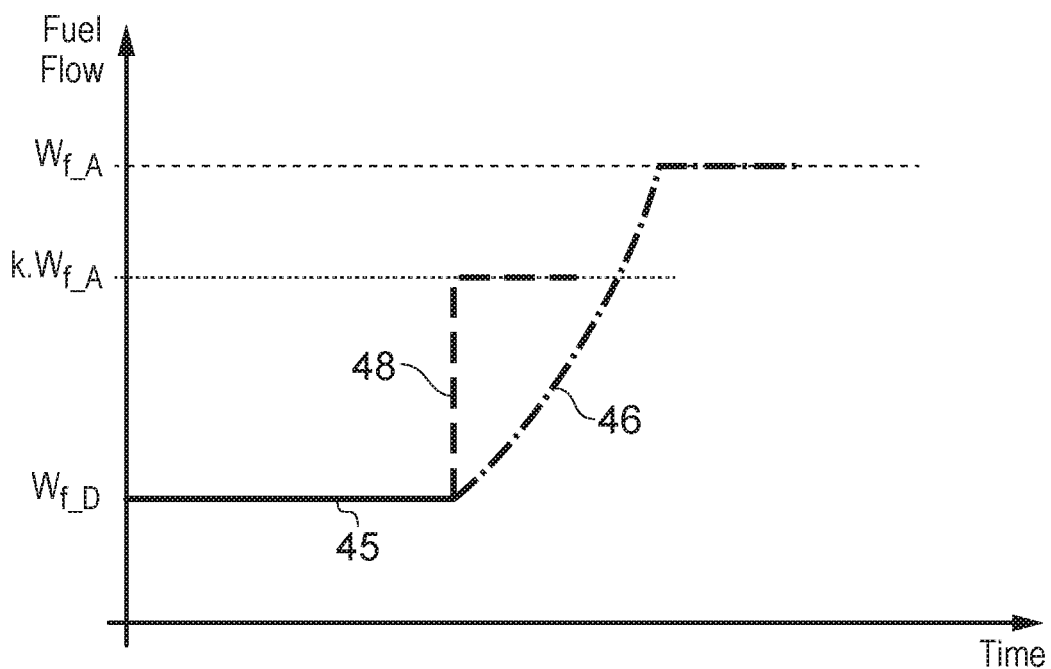
FIG. 5 is a plot of the manner in which an enhanced fuel flow demand schedule acts.

FIG. 5 is a schematic plot of the effect of applying the enhanced fuel flow demand schedule at step 40. At the time at which the maximum fuel flow limiter based on compressor discharge pressure $P_{30}$ is no longer the controlling control law, the fuel flow demand $W_{f\_D}$ is the level 45 shown. The actual fuel flow $W_{f\_A}$ is higher and is shown by the dashed horizontal line. FIG. 5 is a simplified plot since, as seen in FIG. 2, the actual fuel flow $W_{f\_A}$ continues to fall whilst the fuel flow demand $W_{f\_D}$ is lower than the actual fuel flow $W_{f\_A}$ and so the dashed line should have a downward trend.

In a first embodiment the enhanced fuel flow demand schedule applies a rate accelerator 46 to the fuel flow demand $W_{f\_D}$ to rapidly increase the fuel flow demand $W_{f\_D}$ to the level of the actual fuel flow $W_{f\_A}$. The first embodiment is described in more detail with respect to FIG. 6. In second and third embodiments the enhanced fuel flow demand schedule applies a step change to the fuel flow demand $W_{f\_D}$, as shown by line 48, to a predefined proportion k of the actual fuel flow $W_{f\_A}$. The predefined proportion k may be less than one, as illustrated. Alternatively the predefined proportion k may be equal to one, in which case the fuel flow demand $W_{f\_D}$ steps directly to the actual fuel flow $W_{f\_A}$. In a further alternative the predefined proportion k may be greater than one, in which case the fuel flow demand $W_{f\_D}$ steps above the actual fuel flow $W_{f\_A}$ and therefore has a greater effect on surge recovery.

The larger the predefined proportion k, the quicker the surge recovery. However, the smaller the predefined proportion k, the more robust and stable the surge recovery. Therefore it is beneficial to set the predefined proportion k to a value that suitably balances the speed and stability of surge recovery for the particular application of the method 30.

Figure 6:
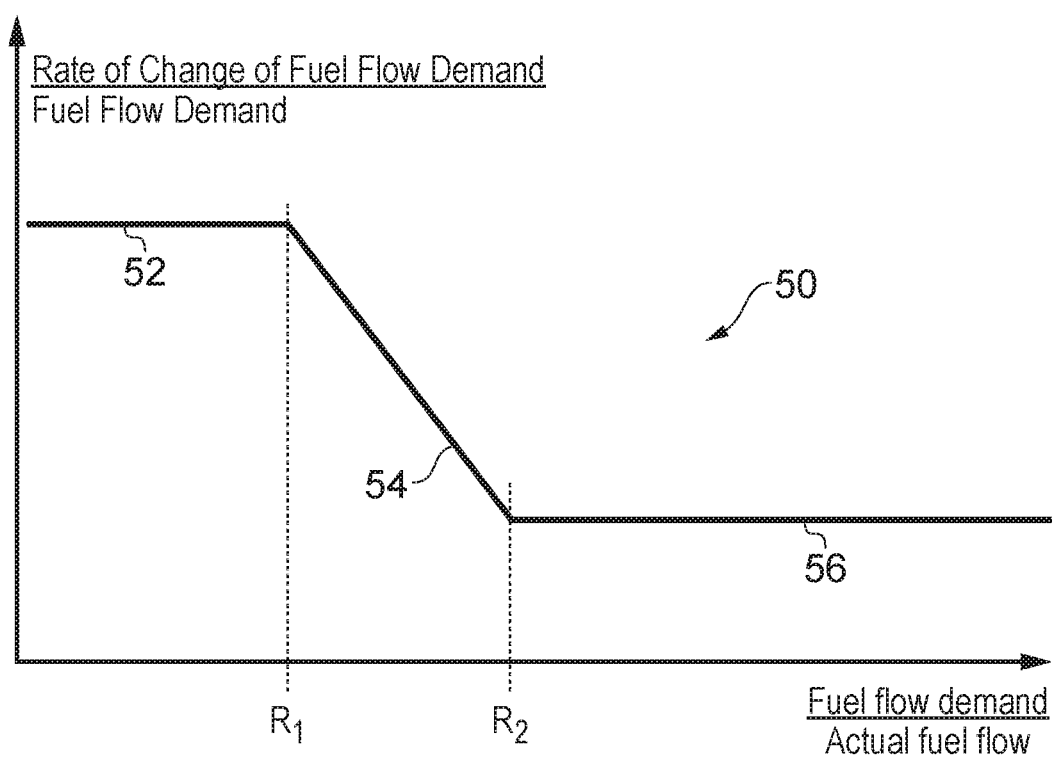
FIG. 6 is a plot of an enhanced fuel flow demand schedule.

The first embodiment of the enhanced fuel flow demand schedule 50 is shown in FIG. 6. The x-axis represents the ratio of fuel flow demand $W_{f\_D}$ to actual fuel flow $W_{f\_A}$. The y-axis represents the rate of change of fuel flow demand $W_{f\_D}^{\cdot}$ which is applied to the underlying fuel flow demand $W_{f\_D}$ due to its relationship to compressor discharge pressure $P_{30}$. The rate of change of fuel flow demand $W_{f\_D}^{\cdot}$ is normalised by division by the fuel flow demand $W_{f\_D}$, thus $W_{f\_D}^{\cdot}/W_{f\_D}$, which is a fuel flow rate limiter. When the ratio is below a first threshold $R_1$ a high rate of increase of fuel flow demand $W_{f\_D}^{\cdot}$ is applied to the fuel flow demand $W_{f\_D}$ at each time step. This is shown by the section of the fuel flow demand schedule 50 which is labelled 52.

When the ratio shown on the x-axis is between the first threshold $R_1$ and a second, higher threshold $R_2$ a different rate of increase of fuel flow demand $W_{f\_D}^{\cdot}$ is applied to the fuel flow demand $W_{f\_D}$ at each time step. This is the section labelled 54. The rate of increase between the thresholds $R_1$, $R_2$ may be a transitional rate of increase of fuel flow demand $W_{f\_D}$ such that the rate is inversely proportional to the magnitude of the ratio. When the ratio is above the second threshold $R_2$ there may be a further rate of increase of fuel flow demand $W_{f\_D}^{\cdot}$ applied. The further rate of increase may correspond to the normal fuel flow control laws. This is section 56 of the fuel flow demand schedule 50 shown in FIG. 6.

The first threshold $R_1$ may be in the range 0 to 0.7, for example around 0.5. Thus when the fuel flow demand $W_{f\_D}$ is less than half of the actual fuel flow $W_{f\_A}$ the high rate of increase 52 of fuel flow demand $W_{f\_D}^{\cdot}$ is applied. The second threshold $R_2$ may be in the range 0.5 to 1, for example around 0.7 to 0.85. Thus when the fuel flow demand $W_{f\_D}$ is 50% to 85% of the actual fuel flow $W_{f\_A}$ the transitional rate of increase 54 of fuel flow demand $W_{f\_D}^{\cdot}$ is applied. The high and transitional rates of increase 52, 54 may be, for example, expressed as slew rates for a mechanical fuel metering valve.

Figure 7:
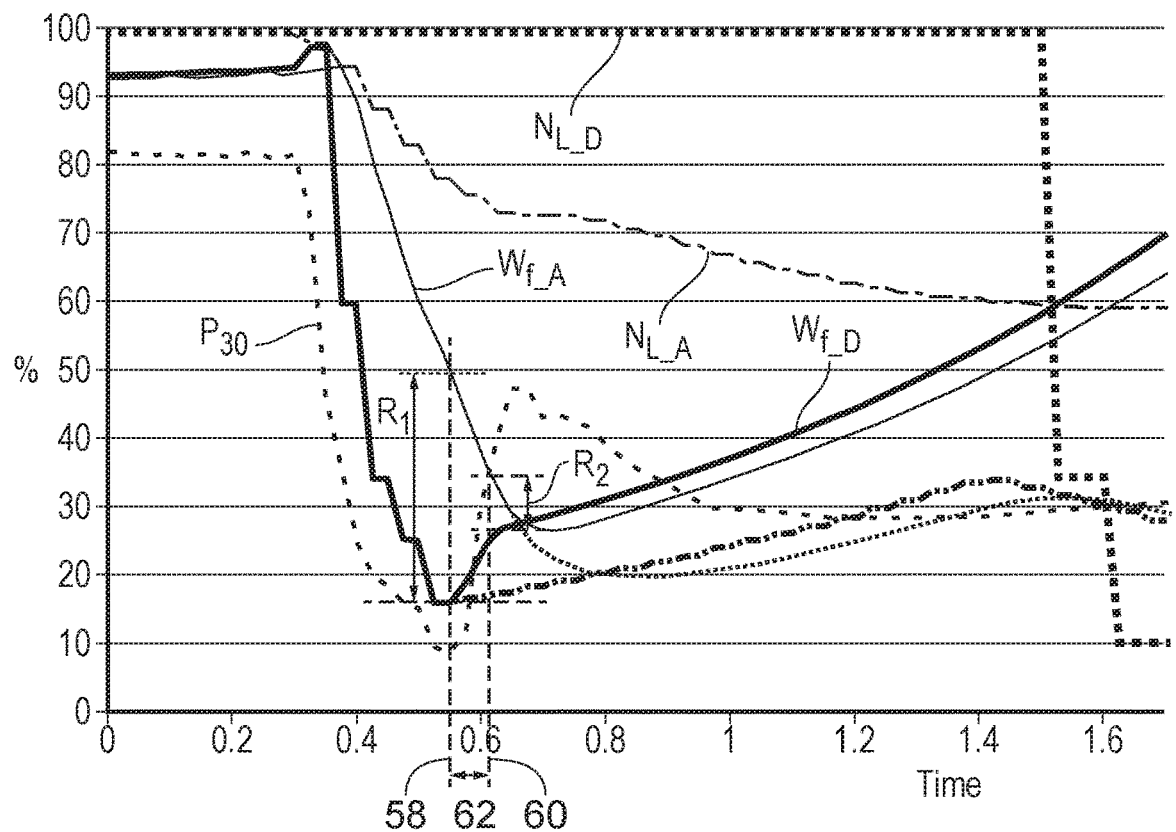
FIG. 7 is a graph of parameters during surge using the enhanced fuel flow demand schedule of FIG. 6.

The effect of the first embodiment of the fuel flow demand schedule 50 can be seen in FIG. 7. The dotted lines correspond to the lines in FIG. 2. The fuel flow demand $W_{f\_D}$ is modified in that it begins to rise more quickly than when controlled by the normal fuel flow control laws. The vertical distance between the fuel flow demand $W_{f\_D}$ and the actual fuel flow $W_{f\_A}$ is the ratio. At the time indicated by dashed line 58 the vertical distance between the fuel flow demand $W_{f\_D}$ and the actual fuel flow $W_{f\_A}$ is less than or equal to the first threshold $R_1$. Thus the fuel flow demand $W_{f\_D}$ is approximately 35% of the actual fuel flow $W_{f\_A}$. At the time indicated by dashed line 60 the vertical distance between the fuel flow demand $W_{f\_D}$ and the actual fuel flow $W_{f\_A}$ is equal to the second threshold $R_2$. Thus the fuel flow demand $W_{f\_D}$ is approximately 80% of the actual fuel flow $W_{f\_A}$.

During the time interval marked by double-headed arrows 62 the transitional rate 54 of increase of fuel flow demand $W_{f\_D}$ is applied by the enhanced fuel flow demand schedule 50. After time 60 the normal control laws are applied, for example comprising an exponential rate of increase of fuel flow demand $W_{f\_D}$. The increase in fuel flow demand $W_{f\_D}$ causes a consequential, lagged increase in the actual fuel flow $W_{f\_A}$. This is shown in FIG. 7. Advantageously the fuel flow demand $W_{f\_D}$ grows more rapidly than in the conventional situation where the enhanced demand schedule 50 is not applied because the base fuel flow demand $W_{f\_D}$, to which the exponential rate of fuel flow demand increase $W_{f\_D}^{\cdot}$ (normal control laws) is applied, is higher.

Advantageously the effect of the enhanced fuel flow demand schedule 50 is that the fuel flow demand $W_{f\_D}$ is driven to track the compressor discharge pressure $P_{30}$ not only as it reduces following a surge event but also as it rises rapidly as the engine 10 recovers from the surge condition 32.

A second embodiment of the enhanced fuel flow demand schedule 50 has a single threshold ratio $R_3$. The schedule 50 is arranged to calculate the fuel flow demand $W_{f\_D}$ necessary to match the threshold ratio $R_3$ of the fuel flow demand $W_{f\_D}$ to the actual fuel flow $W_{f\_A}$. The threshold $R_3$ may be, for example, 0.85. The threshold $R_3$ is chosen so that the fuel flow demand $W_{f\_D}$ does not fall below this proportion of the actual fuel flow $W_{f\_A}$ during normal rapid engine decelerations but only falls below the proportion during surge events. Recovery from surge is quicker the closer the threshold $R_3$ is to one.

Where the fuel flow demand $W_{f\_D}$ is greater than or equal to the threshold $R_3$ multiplied by the actual fuel flow $W_{f\_A}$, thus $W_{f\_D} \geq R_3 \cdot W_{f\_A}$, the rate of increase of fuel flow demand $W_{f\_D}^{\cdot}$ from the normal control laws is applied. As in the first embodiment, this rate $W_{f\_D}^{\cdot}$ may be exponential.

Where the fuel flow demand $W_{f\_D}$ is less than the predefined proportion k multiplied by the actual fuel flow (for example $0.85 \cdot W_{f\_A}$) the second embodiment of the enhanced fuel flow demand schedule 50 performs a calculation, compares it to the fuel flow rate $W_{f\_D}^{\cdot}$ from the normal control laws, and applies the larger value. The calculation is the difference between the product of the threshold ratio $R_3$ and the actual fuel flow $W_{f\_A}$, $R_3 \cdot W_{f\_A}$, and the fuel flow demand $W_{f\_D}$. The difference is then divided by the controller time step being the time step in which updated control instructions can be implemented. The predefined proportion k is the proportion of the actual fuel flow $W_{f\_A}$ to which it is desired that the fuel flow demand $W_{f\_D}$ steps, as shown by line 48 in FIG. 5. Thus the calculation is:

$$\frac{R_3 \cdot W_{f\_A} - W_{f\_D}}{timestep}.$$

Alternatively the calculation is the difference between the actual fuel flow $W_{f\_A}$ and the fuel flow demand $W_{f\_D}$, multiplied by the threshold ratio $R_3$ and divided by the time step:

$$\frac{R_3(W_{f\_A} - W_{f\_D})}{timestep}.$$

The enhanced fuel flow demand schedule 50 applies this calculated rate when the fuel flow demand $W_{f\_D}$ is less than the predetermined proportion k of the actual fuel flow $W_{f\_A}$ unless the normal fuel flow control laws give a larger rate of increase $\dot{W}_{f\_D}$.

Figure 8:
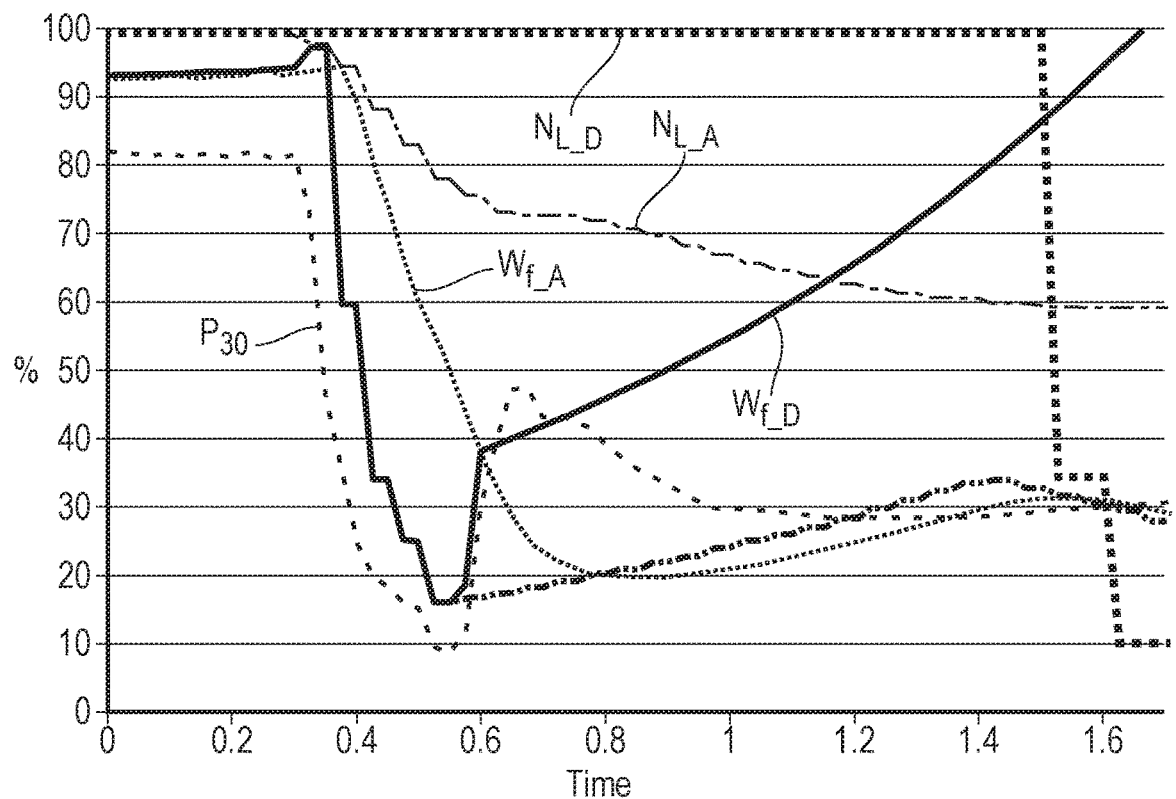
FIG. 8 is a graph of parameters during surge using another enhanced fuel flow demand schedule.

In a third embodiment of the enhanced fuel flow demand schedule 50 the fuel flow demand $W_{f\_D}$ is set to be a sum of two components: one related to the actual fuel flow $W_{f\_A}$ and one related to the fuel flow demand $W_{f\_D}$. A constant n is multiplied by the actual fuel flow $W_{f\_A}$ to give the first component, $nW_{f\_A}$. One minus the constant n is multiplied by the fuel flow demand $W_{f\_D}$ to give the second component, $(1-n) \cdot W_{f\_D}$. The constant n may be, for example, in the range 0.25 to 1.25 inclusive. By changing the value of the constant n the speed and robustness of the recovery of the engine 10 from the surge event can be optimised. Since the constant n is selected to be around unity it biases the schedule 50 to have more influence from the actual fuel flow $W_{f\_A}$ than the fuel flow demand $W_{f\_D}$. As can be seen in FIG. 8 the actual fuel flow $W_{f\_A}$ is considerably larger than the fuel flow demand $W_{f\_D}$ within a short time after the surge event, which occurs around time 0.3, and so this bias forces the fuel flow demand $W_{f\_D}$ to rise quickly. Once the maximum fuel flow limiter is no longer limiting the fuel flow demand $W_{f\_D}$ the normal control laws take over control of the fuel flow demand $W_{f\_D}$, for example applying an exponential rate of increase $\dot{W}_{f\_D}$.

Figure 9:
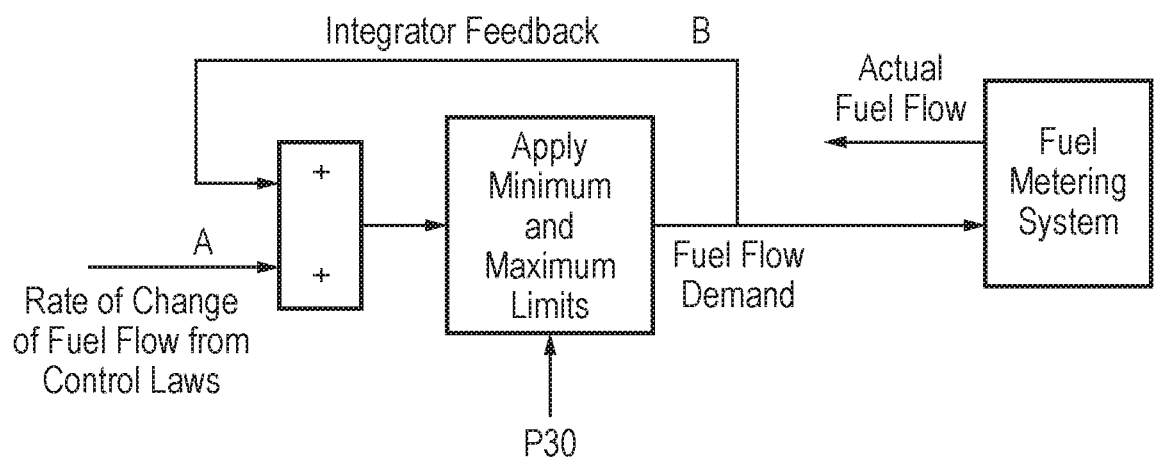
FIG. 9 is a block diagram of an exemplary control arrangement.

A block diagram of an example implementation of the third embodiment is shown in FIG. 9.

Advantageously the third embodiment of the enhanced fuel flow demand schedule 50 applies a more aggressive increase in fuel flow demand $W_{f\_D}$, from the nadir of the compressor discharge pressure $P_{30}$, than the first embodiment and so the base fuel flow demand $W_{f\_D}$ to which the normal, exponential, rate of increase $\dot{W}_{f\_D}$ is applied is higher. Thus the fuel flow demand $W_{f\_D}$ recovers to its pre-surge level more rapidly than the first embodiment and much more rapidly than the conventional method in which no enhanced schedule 50 was applied.

Advantageously the third embodiment of the enhanced fuel flow demand schedule 50 does not require a step of determining if the ratio of fuel flow demand $W_{f\_D}$ up to actual fuel flow $W_{f\_A}$ is less than a threshold ratio before applying the enhanced schedule 50. Instead the calculation can be operational throughout fuel flow control but will only control the fuel flow demand $W_{f\_D}$ up in response to a surge condition 32 and when the maximum fuel flow rate limiter based on compressor discharge pressure $P_{30}$ stops being in control of the fuel flow. Optionally a step to determine if the fuel flow demand $W_{f\_D}$ is less than a threshold ratio R of the actual fuel flow $W_{f\_A}$ may be used to trigger application of the third embodiment of the enhanced fuel flow demand schedule 50.

Although the method 30 is most accurate when the actual fuel flow $W_{f\_A}$ can be measured at step 36, for example from the physical position of the fuel metering valve 74, the method 30 can also be implemented by using a simulated value of actual fuel flow $W_{f\_A}$. Such a simulated value may be derived from a model of the dynamic response of the fuel flow system 68.

Advantageously the method 30 enables other methods to be applied in an engine control system which have an adverse effect on surge recovery. For example some methods to detect and/or accommodate shaft break events, which have some similar characteristics to surge events, have the effect of degrading surge recovery. The method 30 described herein overcomes that degraded surge recovery and so makes use of both methods feasible.

The method 30 is also applicable to marine and industrial gas turbine engines.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A controller configured to control a fuel metering valve by performing the following:
   a. in response to a detected surge condition that occurs while controlling the fuel flow according to fuel control laws, setting a fuel flow demand (Wf_D) proportional to compressor discharge pressure ($P_{30}$), such that the fuel flow demand (Wf_D) varies with varying compressor discharge pressure ($P_{30}$);
   b. detecting actual fuel flow (Wf_A); and
   c. applying a rate accelerator or a step change to the fuel flow demand (Wf_D), which was previously set in response to the detected surge condition, to provide a first rate of increase of the fuel flow demand (Wf_D), while the fuel flow demand (Wf_D) is less than a predefined proportion (k) of the actual fuel flow (Wf_A), the first rate of increase being greater than a rate of increase that would have occurred in response to the detected surge condition under the fuel control laws that were being used prior to setting the fuel flow demand (Wf_D) proportional to the compressor discharge pressure ($P_{30}$).

2. A gas turbine engine comprising:
   a combustor;
   a fuel metering valve that controls fuel flow to the combustor; and
   the controller as claimed in claim 1, operatively connected to the fuel metering valve.

\* \* \* \* \*